United States Patent [19]
Lang et al.

[11] Patent Number: 5,197,444
[45] Date of Patent: Mar. 30, 1993

[54] FUEL-SUPPLY SYSTEM AND TANK ASSEMBLY FOR AN INTERNAL COMBUSTION ENGINE

[75] Inventors: Ernst-Walter Lang, Gerlingen; Nikolaus Benninger, Vaihingen/Enz; Wolfgang Boerkel, Ruelzheim; Günther Plapp, Filderstadt; Rainer Schillinger, deceased, late of Freiburg, all of Fed. Rep. of Germany, by Wolfgang Schillinger, legal representative

[73] Assignee: Robert Bosch GmbH, Stuttgart, Fed. Rep. of Germany

[21] Appl. No.: 754,768

[22] Filed: Sep. 4, 1991

[30] Foreign Application Priority Data

Sep. 4, 1990 [DE] Fed. Rep. of Germany ....... 4027948

[51] Int. Cl.$^5$ .............................................. F02M 37/04
[52] U.S. Cl. .................... 123/514; 123/509; 137/263; 137/571
[58] Field of Search ............... 123/514, 509, 510, 516; 137/571, 574, 576, 263

[56] References Cited

U.S. PATENT DOCUMENTS

| | | | |
|---|---|---|---|
| 4,750,522 | 6/1988 | Griffin | 123/514 |
| 4,860,714 | 8/1989 | Bucci | 123/514 |
| 4,869,225 | 9/1989 | Nagata | 123/514 |
| 4,886,031 | 12/1989 | Scheurbrand | 123/514 |

FOREIGN PATENT DOCUMENTS

| | | | |
|---|---|---|---|
| 2460101 | 6/1976 | Fed. Rep. of Germany | 123/514 |
| 2844053 | 4/1980 | Fed. Rep. of Germany | 123/509 |

*Primary Examiner*—Carl S. Miller
*Attorney, Agent, or Firm*—Walter Ottesen

[57] ABSTRACT

The invention is directed to a system for supplying an internal combustion engine with fuel which includes the following functional components: a tank; a fuel pump; a metering device for metering fuel to the intake air; a feed line for conducting fuel from the fuel pump to the metering device; a reservoir which is so configured and mounted that fuel can be pumped therefrom to the metering device and which is not filled when tanking the tank and which can be again filled from the tank; and a control unit for driving the fuel pump and the metering device. The fuel pump is fixedly connected to the reservoir so that only fuel is pumped therefrom and a reservoir fill pump is provided which continuously maintains the reservoir filled as long as fuel is present in the tank. The system affords the advantage that even when, after tanking, fuel of a composition is present in the tank which is substantially different from the composition of the fuel present in the tank before tanking, the metering device first is supplied with fuel of the old composition and then the composition of the metered fuel only changes slowly. In this way, a continuous stable operation of the internal combustion engine is provided.

8 Claims, 2 Drawing Sheets

FUEL-SUPPLY SYSTEM AND TANK ASSEMBLY FOR AN INTERNAL COMBUSTION ENGINE

FIELD OF THE INVENTION

The invention relates to a system and a fuel tank for supplying fuel to an internal combustion engine.

BACKGROUND OF THE INVENTION

Every conventional system of the kind referred to above includes the following elements: a tank assembly having a tank and a fuel pump; a metering device for metering fuel to the intake air; a feed line for feeding the fuel from the fuel pump to the metering device; and, a control unit for driving the fuel pump and the metering device.

Motor vehicles equipped with internal combustion engines adapted to burn different fuels such as gasoline or gasoline/methanol mixtures are usually equipped with a sensor for measuring the composition of the pumped fuel. The signals of such a sensor makes it possible to adapt precontrol values for the metering of fuel to the particular fuel composition. Precontrol values are applied on a test stand for a pregiven type of fuel such as gasoline. During operation of the engine, these precontrol values such as injection times are adapted with the aid of an adaptation to the particular operating conditions. Taking into account the particular fuel composition can be done with the aid of the signal of the above-mentioned sensor which measures the fuel composition. If injection times for the use of gasoline are applied, then these injection times should be extended, for example by approximately 50%, when the above-mentioned sensor announces that the actual tank content comprises approximately 50% gasoline and 50% methanol.

It is a continuous effort to use as few sensors as possible in the area of motor vehicle electronics. Accordingly, various suggestions have been made to eliminate the above-mentioned sensor for detecting the fuel composition. U.S. Pat. No. 5,094,208 discloses a method wherein the control deviation in the lambda control loop is measured after each tank refill and an adaptation value is so changed that the detected control deviation is eliminated. This method has the disadvantage that it can only function when the lambda control is active; however, this is not the case especially for cold engines. However, even for warm engines, the method is problematical because of the abrupt change of the adaptation value since this procedure can easily lead to control oscillations.

U.S. Pat. No. 5,121,752 discloses various methods which operate to render even cold engines operationally ready when the fuel composition has changed greatly after a tank refill, for example, when a tank containing gasoline has been driven until almost empty and then filled with a fuel comprising for the most part methanol. The fuel composition present is estimated with the aid of the tank conditions before and after tanking and upon the basis of the data of the fuel to be purchased. The precontrol values are then changed for the operation of the engine with fuels of the possible compositions and an investigation is made with which composition the engine will best operate. Control is continued then with these values. Independently of whether the method is applied to a cold engine or not, an adaptation with a short time constant is carried out when the lambda control is released and after filling the tank.

These methods too however present problems for example because the above-mentioned rapid adaptation brings about a slight tendency of control oscillations but nonetheless not so intense as with the method according to the above-mentioned U.S. Pat. No. 5,094,208 wherein an abrupt change of the adaptation value takes place. Poor engine running can develop when operating the engine with values for the different possible compositions when control is made with just those estimated values which lie farthest from those which are applicable for the fuel composition which is actually present.

SUMMARY OF THE INVENTION

The problem nonetheless remained to provide a system for supplying an engine with fuel which is so configured that an operation of the engine free of disturbance as much as possible is then obtainable when fuel is added to the tank which is very different in its composition from the fuel which was supplied to the engine before retanking. In addition, the problem remained to provide a tank assembly especially suitable for fulfilling the above-mentioned purpose.

The system according to the invention for supplying an internal combustion engine with fuel includes the following components: a tank; a fuel pump; a metering device for metering fuel to the intake air; a feed line for feeding fuel from the fuel pump to the metering device; a reservoir which is so configured and mounted that fuel can be pumped therefrom to the metering device, which reservoir does not become filled when filling the tank, and which reservoir can be again filled with fuel from the tank; and, a control unit for driving the fuel pump and the metering device.

It has been known for some time to arrange a reservoir in the fuel-supply system of an internal combustion engine in addition to a tank with this reservoir serving as a reserve container. As soon as the tank is almost empty, a warning lamp lights which is intended to cause the driver to turn a lever which clears the flow of fuel from the reservoir to the tank. This conventional reservoir is filled with the same fuel as the tank when filling the tank of the vehicle. However, it is precisely this action which is prevented in the fuel-supply system of the invention. In the system of the invention, the reservoir is so arranged and configured that its content is not changed when the tank is filled thereby permitting the engine to be supplied with fuel which was available prior to tanking at which time the composition of the fuel in the tank has changed as a consequence of tanking. In this way, the engine can be operated with the old adaptation values until the adaptive lambda control is released for operation after the engine is restarted after tanking.

The reservoir can be arranged so that fuel can be pumped from the reservoir or from the tank. In this case, a switchover valve has to be provided with which the feed line of the fuel pump can be switched back and forth between the reservoir and the tank.

According to a preferred embodiment of the system of the invention, the fuel pump is fixedly connected to the reservoir in order to only pump fuel therefrom; and, a reservoir fuel pump is provided which continuously keeps the reservoir filled as long as fuel remains in the tank.

This system of the invention affords the advantage that when the composition of fuel in the tank has changed drastically when tanking, the metering device is supplied with fuel having a composition which changes only slowly starting from the composition present before tanking. The larger the content of the reservoir compared to the content of the tank, the slower will be the change of the fuel composition.

The reservoir is maintained as full as possible continuously so that after tanking, the largest possible quantity of fuel of the known composition is present. For this reason, a higher static pressure is generally present in the reservoir than in the tank wherein the level of fuel drops. Fuel is pumped from the reservoir to the metering device and the reservoir is refilled from the tank wherein a lower pressure is present. For these reasons, the reservoir fill pump is provided which overcomes the above-mentioned pressure difference. This reservoir fill pump can be an electrically driven pump. It is however especially advantageous if the pump is configured as a liquid-jet pump which is driven by a component flow of the fuel which is pumped by the fuel pump. The pump injects the driving fuel through an opening in the reservoir with fuel being entrained from the tank. So that during those times in which the fuel pump is not pumping fuel, that is when the engine is at standstill, no blending of the fuel in the reservoir and in the tank takes place through the opening, this opening being closable by a controllable valve. This can be a magnetic valve; however, it is especially advantageous if this valve is hydraulic. In this way, it can be opened by the pressure generated by the fuel pump. It is advantageous to connect the liquid-jet pump to the feed line in order to effectively drive this pump.

An adaptation as slow as possible of the fuel in the reservoir to the fuel in the tank is provided by connecting the return line into the reservoir.

The tank assembly of the system of the invention includes a tank, a reservoir, a fuel pump which pumps from the reservoir and a pump for pumping fuel from the tank into the reservoir.

BRIEF DESCRIPTION OF THE DRAWINGS

The invention will now be described with reference to the drawings wherein.

PREFERRED EMBODIMENTS OF THE INVENTION

Figure 1:
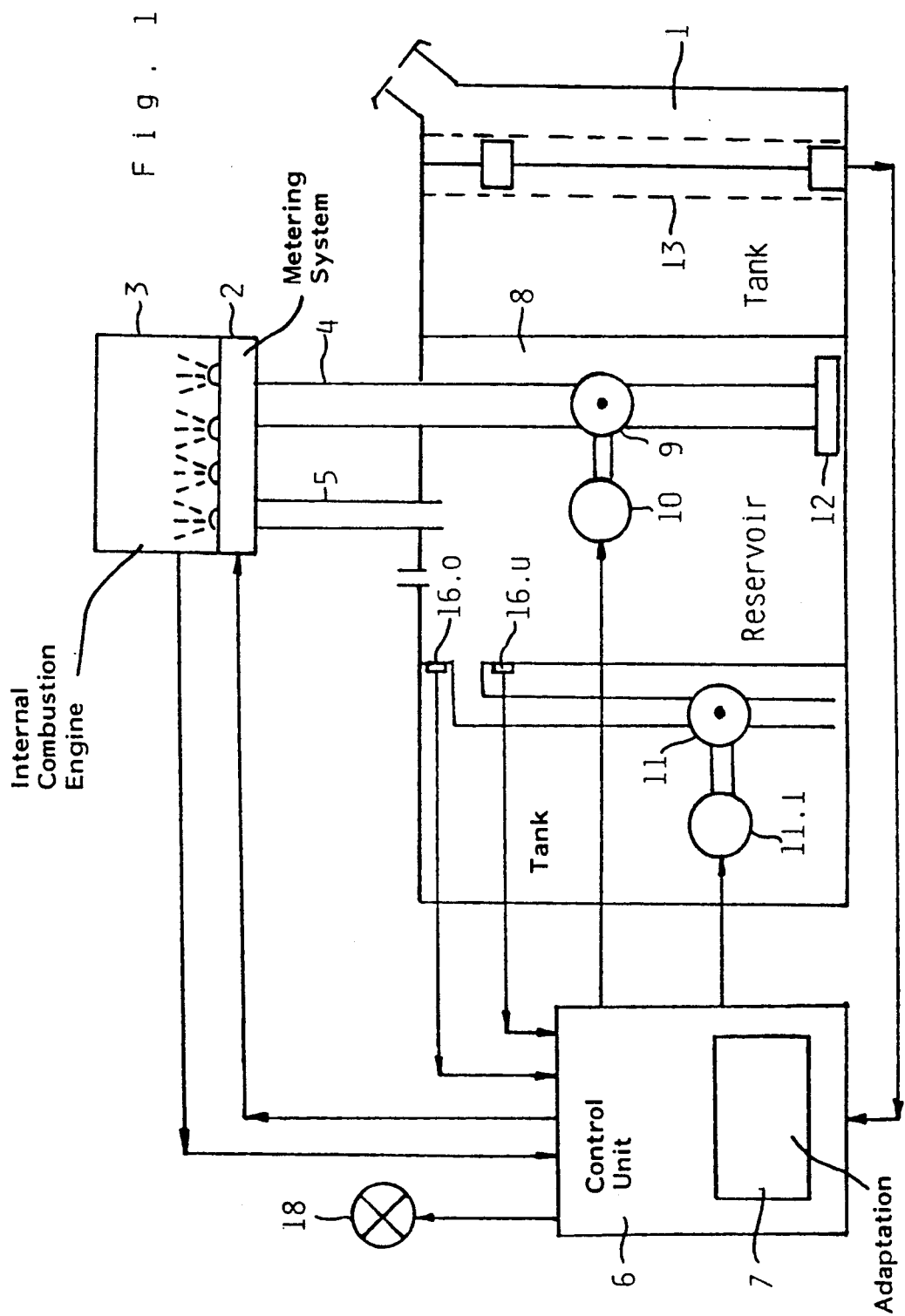
FIG. 1 is a schematic of the fuel-supply system for an internal combustion engine having a reservoir from which fuel is pumped to a metering device and with the reservoir being refilled from a tank; and, FIG. 2 is a schematic of a tank and of a reservoir having a fuel pump and a hydraulic reservoir fill pump.

The fuel-supply system of FIG. 1 includes a tank 1, a metering device 2 for an internal combustion engine 3, a feed line 4 leading to the metering device 2 and a return line 5 from the metering device as well as a control unit 6 having adaptation 7. The following are mounted in the tank 1: a reservoir 8, a reservoir fill pump 11 having an electric motor 11.1 and a fill level sensor 13. The following elements are contained within the reservoir 8: a fuel pump 9 having an electric motor 10 and an intake filter 12 through which the fuel pump 9 pumps fuel from the reservoir 8 into the feed line 4. In addition, a lower switch sensor 16.$u$ and an upper switch sensor 16.$o$ are provided. The function of this system is described in the following.

As soon as the engine 3 is started and the fuel pump 9 begins to pump, fuel is pumped from the reservoir 8 into the metering device 2. Excess fuel flows back into the reservoir 8 via the return line 5. The fuel level in the reservoir 8 drops since the quantity of excess fuel is less than the quantity of the fuel which is supplied to the metering device. As soon as the fuel level in the reservoir 8 reaches the level of the lower switch sensor 16.$u$, the control unit 6 controls the motor 11.1 of the reservoir fill pump 11 such that this pump 11 pumps fuel from the tank 1 into the reservoir 8. The level in the reservoir 8 climbs accordingly. As soon as the upper switch sensor 16.$o$ is reached, the control switches off the motor 11.1 of the reservoir fill pump 11. This operation of switching on and off the reservoir fuel pump 11 repeats until the tank 1 is empty. This is indicated to the control 6 via a corresponding signal from the fill level sensor 13 in the tank 1. The control unit 6 then causes the warning lamp 18 to light to inform the driver that the tank 1 is empty. The engine 3 can however be driven further for a while, namely, until the content of the reservoir 8 has been emptied.

The foregoing sequence achieves the effects described below.

The assumption is made that gasoline is present in tank 1 and also in reservoir 8 but that the tank has been driven almost empty which is indicated to the driver via the optical output of the signal from the fill level sensor 13. The driver then tanks a mixture of gasoline and methanol, for example a blend of 50% of each of the mentioned components. If fuel of this composition is metered to the intake air, then injection times are to be selected which are approximately 50% longer than those injection times which are applicable for gasoline. It is difficult to correctly inform the metering device about the required change of injection times when there is no sensor available for the composition of the fuel.

The above-mentioned sequence affords the advantage that after tanking the fuel which is supplied to the metering device is not abruptly changed but only slowly changed when there is a fuel of a new composition in the tank 1 after tanking. This is the case because after tanking, unchanged fuel of that composition is present in reservoir 8 as was present before the tank 1 was filled. Since the metering device 2 is supplied only with fuel from the reservoir 8, the metering device even after tanking first receives fuel of the known composition so that the precontrol values adapted in advance of filling the tank are used unchanged.

During subsequent operation of the engine, the composition of the fuel in reservoir 8 changes only slowly since into the reservoir only that fuel is refilled from the tank 1 which was supplied by the metering device 2. This slow change affords the advantage that the fuel composition in the warm-up phase of the engine after a restart after tanking is still essentially the same as before tanking. If the engine is finally sufficiently warm for adaptive precontrol, the adaptation 7 corrects the adaptation values in the control 6 in order to consider the fuel characteristics so that these changing characteristics are present on the precontrol end of the lambda control. The ignition angles are also changed on the basis of the fuel adaptation values. Since the fuel characteristics change only slowly because of the above-mentioned slow fuel blending, even a relatively sluggish adaptation has adequate time to determine correct adaptation values. This contributes considerably that the adaptation to the changed fuel characteristics can be undertaken without the danger of the occurrence of control oscillations.

The arrangement according to FIG. 1 includes the electrically driven reservoir fill pump and the two switch sensors 16.u and 16.o and is appropriate for explaining the principle of the above-mentioned system. In a practical embodiment, it is more advantageous to omit the switch sensors and to permit the reservoir fill pump to work against a pregiven overpressure which can take place by using an overpressure valve in the output line of the reservoir fill pump or by using a flow pump which only generates a pregiven pressure.

Figure 2:
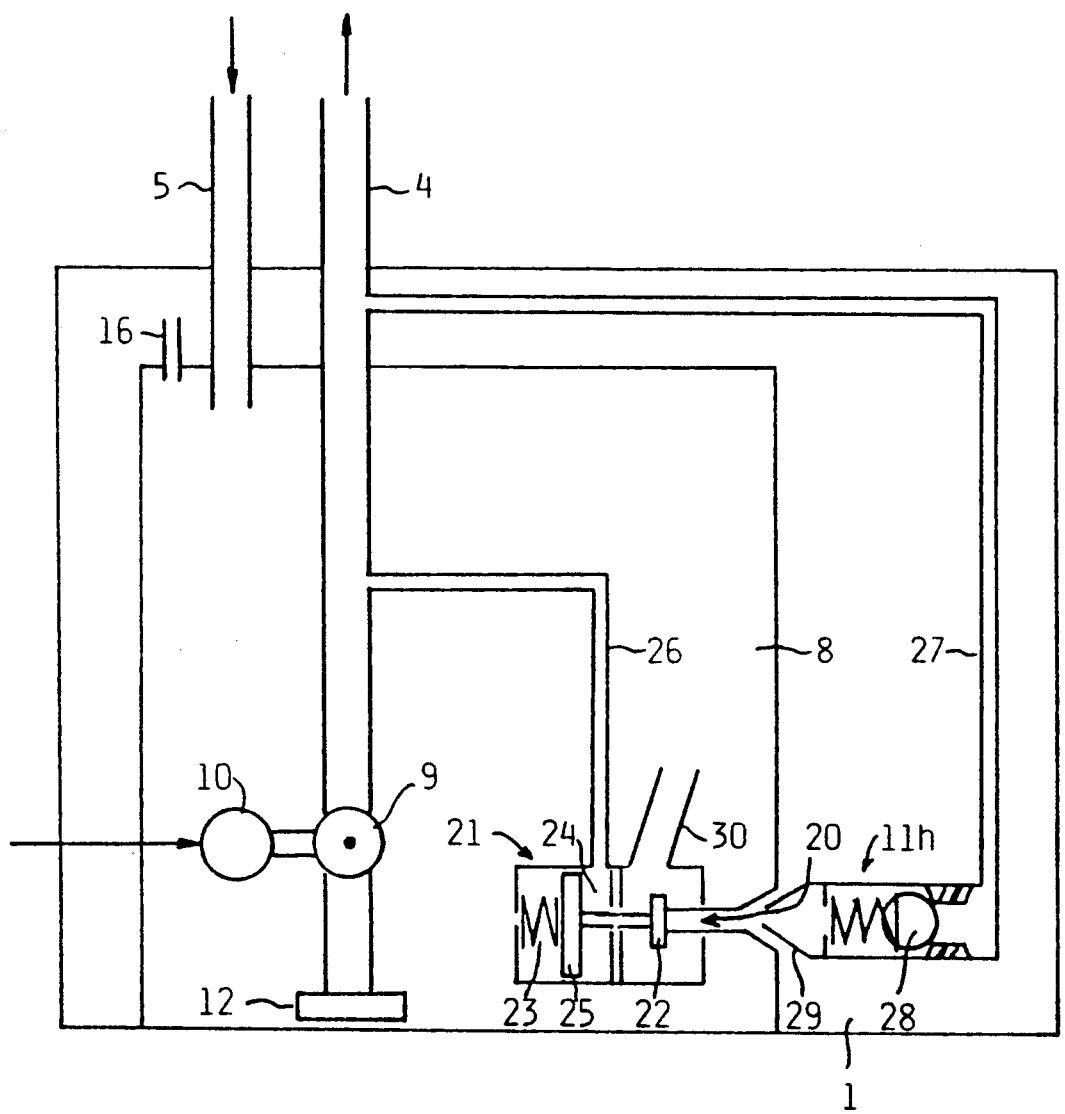

It is however especially advantageous to use a hydraulically-driven reservoir fill pump 11.h such as shown in the partially illustrated system of FIG. 2.

In FIG. 2, the internal combustion engine 3 with the metering device 4 as well as the control unit 6 incorporating adaptation 7 have been omitted. The reservoir 8 includes an opening 20 through which the liquid-jet pump 11.h injects fuel into the reservoir 8. The opening 20 is closable via a controllable valve 21 so that there is no exchange between the fuels in the reservoir and in the tank 1 when the fuel pump 9 is at standstill. This valve 21 includes a valve disc 22 which is pressed against the opening 20 via a force pregiven by the spring 23 so that this opening 20 is only cleared after a specific pumping pressure of the fuel pump 9 is reached. For opening the valve 21 starting with the above-mentioned pressure, the valve 21 includes a pressure chamber 24 having a piston 25 in which a control line 26 opens which branches from the feed line 4.

A supply line 27 branches from feed line 4 in addition to the control line 26. The supply line 27 supplies the liquid-jet pump 11.h with fuel for driving the same. The liquid-jet pump 11.h includes a check valve 28 which opens at a pressure which is slightly greater than that pressure at which the valve disc 22 in the controllable valve 21 lifts off of the opening 20 in reservoir 8. This ensures that the opening 20 is clear when the liquid-jet pump 11.h begins to operate or when first only air is pumped when filling an empty reservoir and fuel can flow from the tank 1 into the reservoir when the opening 20 is clear. The pump 11.h then injects fuel into the opening 20 through a nozzle 29 with fuel from the tank 1 being entrained therewith. A vent opening 16 permits vapor bubbles to be directed away. The vent opening 16 must be kept very small so that the reservoir is not flushed.

The function of the system described with respect to FIG. 2 corresponds substantially to the function explained with respect to FIG. 1 with the exception that the reservoir fill pump is a liquid-jet pump and that a controllable valve is provided on the reservoir in order to block the reservoir 8 with respect to the tank 1 as long as the liquid-jet pump is not operating.

The outlet line 30 of the controllable valve 21 is directed upwardly at an inclination in the embodiment of FIG. 2. This prevents fuel supplied to the tank to be drawn by suction directly through the intake filter 12 by the fuel pump 9 driven by the electric motor 10.

In the embodiments shown, the return line 5 opens into the reservoir 8 which, as explained above, is advantageous for a very slow blending of the reservoir content with the tank content. The return line can however open into the tank.

In the case of a hydraulic configuration of the reservoir fill pump, it is possible to connect this pump to the return line 5 instead of to the feed line 4. In this case, the fuel component flow pumped by the fuel pump for driving the liquid-jet pump is a return fuel flow instead of a feed fuel flow. However, a relatively large return flow is required also at full load. Furthermore, it is a disadvantage that a larger pump flow is required because of the reduced return pressure for pumping a specific quantity of fuel from the tank into the reservoir which leads to a more rapid blending of the fuel in the reservoir with the fuel from the tank.

In the embodiment of FIG. 2, the controllable valve for closing the opening 20 in the reservoir 8 can be a magnetic valve in lieu of the hydraulically-controlled valve described.

It is also noted that a check valve is provided in the feed line 4 in conventional systems. This is also used for a system having a reservoir and especially a system having a liquid-jet pump wherein the least pressure must be adjusted so that a pressure for opening the hydraulic valve 21 can be built up when the reservoir is empty.

It is understood that the foregoing description is that of the preferred embodiments of the invention and that various changes and modifications may be made thereto without departing from the spirit and scope of the invention as defined in the appended claims.

What is claimed is:

1. A system for supplying fuel to an internal combustion engine having an air intake and being adapted to burn different kinds of fuel, the system comprising:

a tank for receiving fuel from outside of said system;

a metering device for metering fuel to the intake air;

a reservoir separate from said tank and being configured to prevent fuel from entering said reservoir while said tank receives fuel from outside of said system;

fuel pump means for pumping fuel from said reservoir to said metering device;

control means for driving said fuel pump means and said metering device; and, transfer means for continuously transferring fuel from said tank into said reservoir when the engine is running so that only that amount of fuel is refilled from the tank which was supplied by the metering device.

2. The system of claim 1, said fuel pump means including: a fuel pump connected to said reservoir so as to be able to pump fuel only from said reservoir; and, a feed line connecting said fuel pump to said metering device; and, said transfer means including a fill pump for supplying said reservoir with fuel from said tank as long as fuel remains available in said tank.

3. The system of claim 2, said fill pump being a liquid-jet pump which is driven by a component flow of the fuel pumped by said fuel pump to pump a liquid jet of fuel; said tank and said reservoir conjointly defining a partition wall separating said tank from said reservoir; said transfer means further including an opening formed in said partition wall through which said liquid jet of fuel passes into said reservoir with fuel from said tank being entrained in said liquid jet; and, controllable valve means disposed at said opening in order to close said opening during the time that said fuel pump does not pump fuel.

4. The system of claim 3, said fuel pump being mounted relative to said reservoir for generating pressure in the fuel; and, said controllable valve means being a hydraulic valve which is opened by said pressure.

5. The system of claim 4, said liquid-jet pump being connected to said feed line.

6. The system of claim 2, said fuel pump means further including a return line opening into said reservoir for returning excess fuel thereto.

7. A tank assembly for supplying a fuel metering device of an internal combustion engine with fuel, the engine being adapted to burn different kinds of fuel, the tank assembly comprising:

a tank for receiving and holding fuel therein;

a reservoir separate from said tank and being configured to prevent fuel from entering said reservoir while said tank receives fuel from outside of said assembly;

a fuel pump for pumping fuel from said reservoir to said fuel metering device;

transfer means for continuously transferring fuel from said tank into said reservoir when the engine is running so that only that amount of fuel is refilled from the tank which was supplied by the metering device; and, said transfer means including a fill pump for pumping fuel from said tank into said reservoir.

8. The tank assembly of claim 7, said fill pump being a liquid-jet pump.

* * * * *